United States Patent [19]

Johnson

[11] Patent Number: 4,803,615
[45] Date of Patent: Feb. 7, 1989

[54] MICROCODE CONTROL OF A PARALLEL ARCHITECTURE MICROPROCESSOR

[75] Inventor: William M. Johnson, Leander, Tex.

[73] Assignee: International Business Machines Corporation, Armonk, N.Y.

[21] Appl. No.: 59,167

[22] Filed: Jun. 8, 1987

Related U.S. Application Data

[63] Continuation of Ser. No. 666,789, Oct. 31, 1984, abandoned.

[51] Int. Cl.[4] .............................................. G06F 9/22
[52] U.S. Cl. .................................................. 364/200
[58] Field of Search ... 364/200 MS File, 900 MS File

[56] References Cited

U.S. PATENT DOCUMENTS

| 4,001,788 | 1/1977 | Patterson et al. | 364/200 |
|---|---|---|---|
| 4,179,731 | 12/1979 | Yamazaki | 364/200 |
| 4,179,737 | 12/1979 | Kim | 364/200 |
| 4,199,811 | 4/1980 | Borgerson et al. | 364/200 |
| 4,558,411 | 12/1985 | Faber et al. | 364/200 |
| 4,571,673 | 2/1986 | Horst et al. | 364/200 |

OTHER PUBLICATIONS iAPX 86/88 User's Manual, Intel Corporation, Aug. 1981, 4-1 to 4-64.
Langdon, Jr. G. G., "Computer Design", Computeach Press Inc., 1982, pp. 370-375, 386-387, 402-407, 28, 29, 156, 157, 488-491.

*Primary Examiner*—Gareth D. Shaw
*Assistant Examiner*—Jonathan C. Fairbanks
*Attorney, Agent, or Firm*—J. F. Villella, Jr.; Thomas E. Tyson

[57] ABSTRACT

A microprogrammed parallel processor including a plurality of subprocessors operates under the control of microinstructions. Each microinstruction contains a plurality of micro-operations each of which requires one or more subprocessors for execution. All micro-operations for which required subprocessors are available are immediately carried out. Any remaining micro-operations within a microinstruction which are not executed due to lack of subprocessor availability are recycled. These remaining micro-operations are executed in subsequent cycles as a required subprocessor becomes available. The entire microinstruction is not recycled but only those portions of it, i.e., the unexecuted micro-operations, are recycled and executed in a subsequent cycle. The microinstruction being executed is stored in a latch until all micro-operations within the microinstruction are executed. At that time, the next microinstruction is fetched into the latch.

6 Claims, 3 Drawing Sheets

MICROCODE CONTROL OF A PARALLEL ARCHITECTURE MICROPROCESSOR

This is a continuation of application Ser. No. 666,789 filed Oct. 31, 1984, now abandoned.

DESCRIPTION

1. Technical Field

This invention relates to the sequential processing of microinstructions in a parallel architecture microprocessor having a plurality of units or subprocessors.

2. Background Art

In general, a microcoded processor requires relatively simple synchronous operation at the microcode level. However, performance improvements may be achieved by dividing the processor into smaller subprocessors or units. Each subprocessor may then be optimized to do a particular task with maximum efficiency and in parallel with other subprocessors. The following are examples of such typical subprocessors: Instruction prefetch unit; register file and control; execution unit; channel interface unit; and control store and control decodes.

The division of a processor into smaller subprocessors or units introduces difficulty into the microcode control of such subprocessors. This difficulty arises because of the interlocks required between parallel units. Since each unit, except the execution unit, operates asynchronously to microinstruction execution, it is not always possible for a given microinstruction to be successfully completed.

For example, a microinstruction to perform a load operation may not be able to be completed because the channel interface queue is full. In the past, this situation has been overcome by executing a microinstruction to test the availability of the channel interface queue before the load microinstruction is executed. The use of such a test microinstruction, however, adds an extra cycle to all load operations. This is undesirable because the channel interface queue should be available most of the time. Additionally, this approach adds two extra cycles when the interface queue is not available during the cycle which tests its availability, but would be available in the next cycle in which the load microinstruction could be executed. Consequently, any approach which tests the availability of the channel interface queue before the load microinstruction is executed tends to add unnecessary cycles.

The interlock problem becomes even more complex as the microinstruction becomes more horizontal, i.e., as the microinstruction performs more micro-operations. For example, a microinstruction to perform a load operation may be fetching the next instruction from an instruction prefetch unit; fetching operands for the next execute cycle from a register file; allocating register file address logic which enables load operations to be overlapped with instruction execution; and, allocating a channel interface queue for the load request. Any one of these operations may not be successfully completed.

Another problem that arises because of the horizontal nature of a microinstruction is that some micro-operations within a given microinstruction may be successfully completed, while other micro-operations within the same microinstruction may not be successfully completed. Consequently a given microinstruction may have any combination of successful and unsuccessful micro-operations. Such unsuccessful micro-operations within a given microinstruction may take a number of clock cycles to be resolved.

One method for executing microcode in a parallel processor is shown in U.S. Pat. No. 4,179,737. In accordance with the method disclosed therein, instead of waiting for all units or subprocessors to become available, those micro-operations for which resources are available are immediately carried out. The entire microinstruction is then recycled until such time as all the units or subprocessors necessary for completion of all of the micro-operations within a given microinstruction are available. Only at that time would the system proceed with the next microinstruction. Such a method requires the repetition of already completed micro-operations and consequently, delays the execution of micro-operations which could be completed successfully.

In another system using microcode control, sequences of microinstructions are carried out to effect certain overall instructions or operations. If any of the instructions in a sequence cannot be carried out, there is a repetitive iteration so as to enable the carrying out of such instructions. However, this system which is disclosed in U.S. Pat. No. 4,001,788, does not apply to a parallel architecture processor and hence does not involve the use of parallel microinstructions.

In yet another microprogrammed control system, described in U.S. Pat. No. 4,179,731, a memory stores microinstructions for a branching microinstruction; an address register stores the address of the next microinstruction to be executed; and, a microinstruction register stores the microinstruction to be executed. The program operation of the microprogrammed control system depends on whether the microinstruction stored in the microinstruction register is the branching one or not. The operation of ordinary microinstructions is executed whenever the microinstruction to be executed is of the non-branching variety. Whenever a branching microinstruction is to be executed, an operation is performed which makes the operation of the branching microinstruction equivalent to the operation of a ordinary microinstruction. However, the interlock problems and any solution thereto is not discussed therein.

SUMMARY OF THE INVENTION

Accordingly, it is an object of this invention to provide improved microcode control of a parallel architecture processor.

It is another object of this invention to provide a microcode controlled parallel processor which improves performance by executing micro-operations within a given microinstruction as soon as possible.

These and other objects are accomplished by altering the way in which the microcode in a parallel processor is sequenced. In accordance with this invention, as long as all micro-operations within a given microinstruction are successfully completed, then the next sequential microinstruction which is being fetched from a control store is executed in the next clock cycle of the system. If any one microinstruction has one or more unsuccessful micro operations, then that microinstruction is altered by random logic and the unsuccessful micro-operations are re-executed in the next clock cycle.

Contrary to current microprogrammed systems, a system according to the present invention would enable the processing of micro-operations without having to wait for the availability of all subprocessors or units required by the microinstruction. A microinstruction is stored in a register during execution. During this storage, whatever portion or micro-operations of this microinstruction may be carried out, are carried out. Those micro-operations in the microinstruction which cannot be carried out are recycled until the units which they require become available so that they may be carried out. The entire microinstruction itself is not recycled but rather only that portion or micro-operations which remain at the end of the given clock cycle.

BEST MODE FOR CARRYING OUT THE INVENTION

Figure 1:
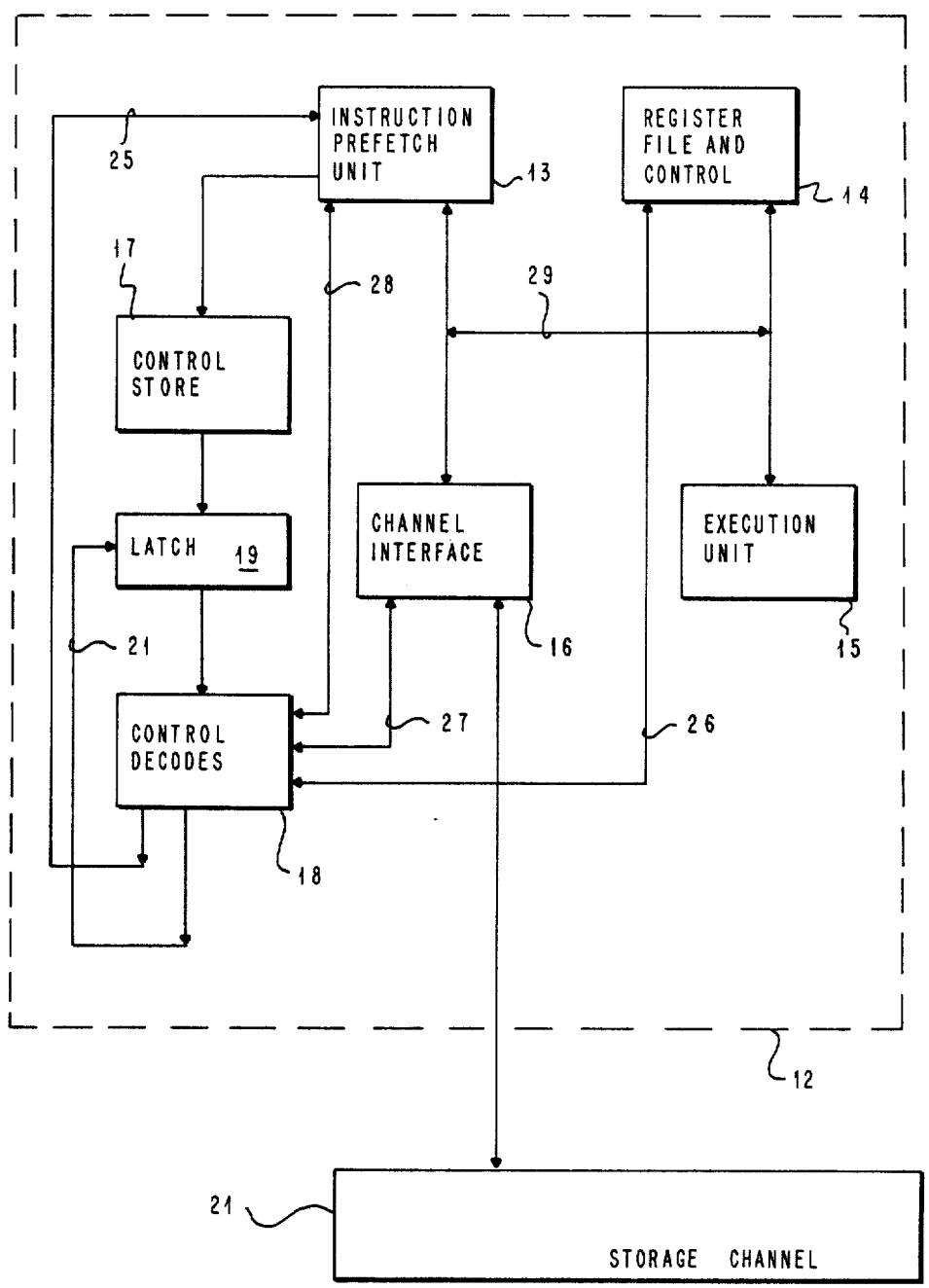
FIG. 1 is an overall system diagram of a parallel architecture processor.

Referring now to FIG. 1, there is shown a microcoded processor 12 which has been divided into a plurality of smaller units or subprocessors. Processor 12 may be broken down into the following five major units: Instruction prefetch unit 13; register file and control 14; execution unit 15; channel interface 16; and, control store 17 and control decodes 18 along with latch 19. Although the connections between the various subprocessors or units have been shown as single lines, it will be appreciated that such connections may take the form of buses with data traveling on separate lines between connected units. Storage channel 21 communicates with various ones of the subprocessors through channel interface unit 16. The operation of storage channel 21 does not form a part of the present invention and will not be discussed further.

Instruction prefetch unit (IPU) 13 works with channel interface unit 16 so as to keep processor 12 supplied with instructions. IPU 13 attempts to fetch instructions in advance of their execution so as to minimize the apparent instruction access time.

Register file and control unit 14 controls the reading and the writing of the register file. Register file and control unit 14 also works with channel interface unit 16 to enable the execution of data loads and data stores. The operation of register file and control 14 is also such that data loads and data stores may be overlapped with instruction execution.

Execution unit 15 contains most of the random logic required for the execution of microinstructions. It also supplies addresses to enable the data loads and data stores. Instruction execution by execution unit 15 is overlapped with operand fetches from the register file and result stores to the register file.

Channel interface unit 16 accepts requests for instruction and data accesses; formats data and addresses; and, generates and accepts transfers across storage channel 21.

Control store 17 and control decodes 18 generate the major control signals for the remaining subprocessors based on microinstruction decodes. Control decodes 18 also receives information from the remaining subprocessors that a requested subprocessor is available for operation. This information is relayed to latch 19 so as to enable the sequencing of a microinstruction stored in latch 19.

In operation, microinstructions being executed are stored in latch 19. Information in the "Next Address" field at the end of each microinstruction is provided to control decodes 18 in order to fetch the next microinstruction to be executed. This information is output over line 25 to addressing logic within instruction prefetch unit 13. An address is then output from IPU 13 to control store 17. Control store 17 is then accessed using the address provided by instruction prefetch unit 13. Control store 17 provides the next microinstruction to be executed which is then stored in latch 19 during the execution of said microinstruction.

Each microinstruction typically contains several micro-operations which must be performed in order to successfully complete a given microinstruction. Whenever a new microinstruction is fetched into latch 19, the subprocessors required to perform the micro-operations within that microinstruction are relayed to control decodes 18. Control decodes 18 then checks the availability of each of the required subprocessors 13, 14, and 16 over lines 26, 27, and 28, respectively. The requested subprocessors then inform control decodes 18 of their availability. This information is then output over line 21 to latch 19. Such information controls the sequencing of the execution of the microinstruction in latch 19.

Whenever one of the required subprocessors signals that it is unavailable, the micro-operations having available subprocessors are carried out. The unexecuted micro-operations are then recycled and once again the availability of all required subprocessors is checked. If any required subprocessors remain unavailable, once again all micro-operations that can be carried out are carried out. This process continues until all the micro-operations in a microinstruction are executed. However, once a given micro-operation in a microinstruction that is being executed is carried out, then that micro-operation is not repeated.

Figure 2:
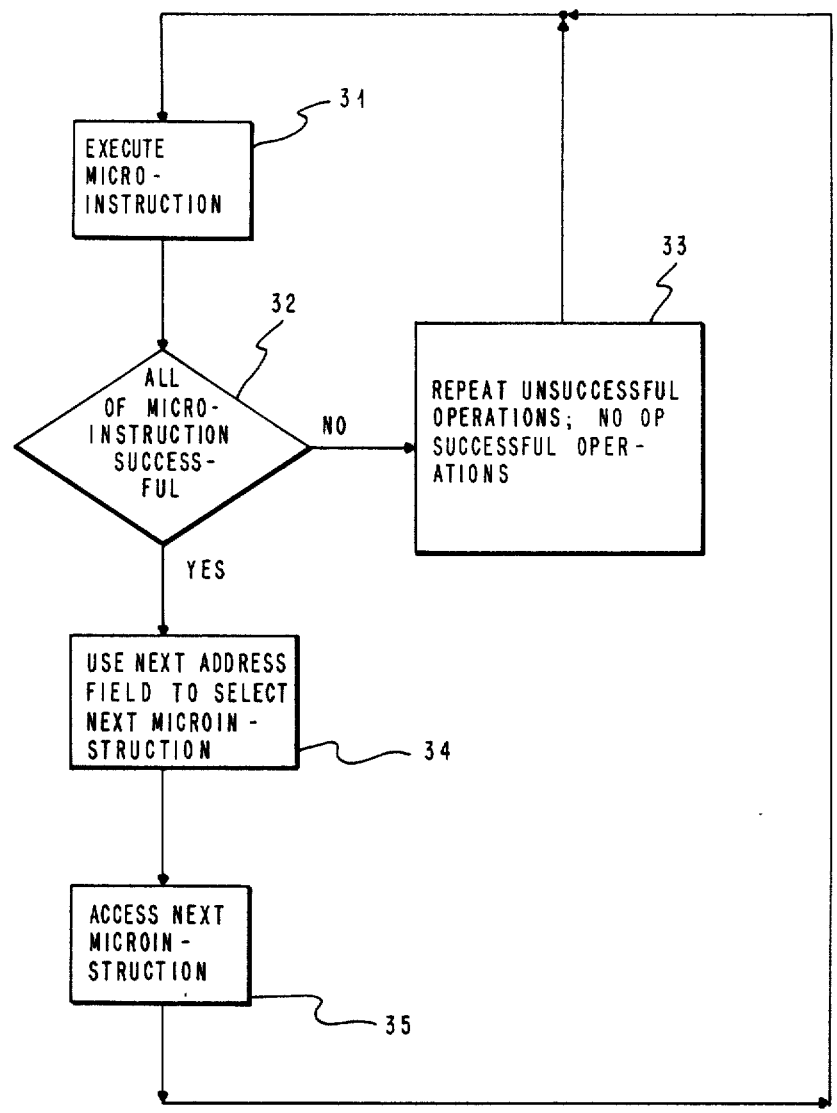
FIG. 2 is a flow chart showing the operation of the system shown in FIG. 1 according to the present invention.

The overall operation of the system shown in FIG. 1 with respect to microinstruction execution is illustrated in the flow chart of FIG. 2. In block 31, a microinstruction in latch 19 is executed. In block 32, a determination is made as to whether or not all of the micro-operations in the microinstruction have been successfully completed. The completion of such micro-operations, as previously described, depends upon the availability of all required subprocessors. If all micro-operations are not successfully completed, then block 33 requires that all unsuccessful micro-operations be repeated. Once again, it is emphasized that only those unsuccessful micro-operations are repeated. Any successful micro-operation is not repeated, but rather a "no operation" signal is supplied by control decodes 18 in the next clock cycle to the microinstruction in latch 19 for those successful micro-operations. If all of the micro-operations in a given microinstruction have been successfully completed, then block 34 provides that the next address field near the end of a microinstruction is used to select the next microinstruction address so as to access and fetch the next microinstruction. Finally, in block 35, the next microinstruction is accessed and input to latch 19 using the table previously described within control store 17.

Figure 3:
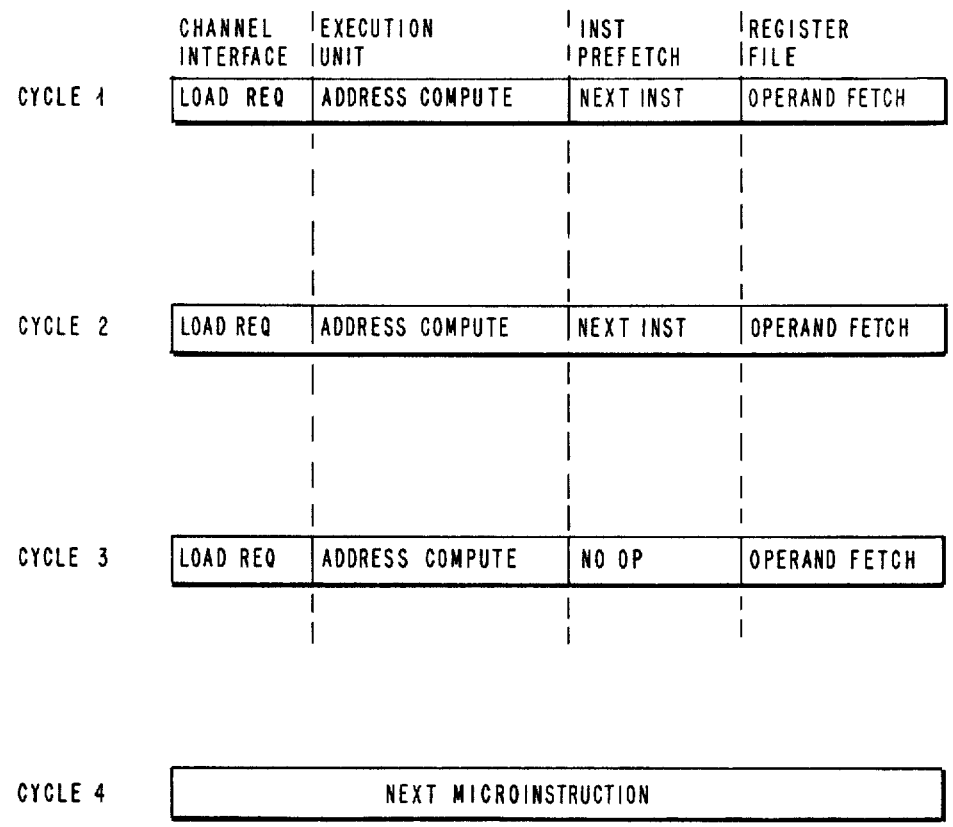
FIG. 3 is a chart of the execution states over four cycles of a microinstruction.

FIG. 3 illustrates one example of the execution of various micro-operations within a microinstruction over several clock cycles. The microinstruction for cycle 1 attempts to generate a load request to the channel interface unit 16 and to access the next instruction to be executed from the instruction prefetch unit 13. At this time, the channel interface unit 16 is unavailable and the next instruction has not yet been received from the storage channel 21. During this first cycle, execution unit 15 is being used to calculate the address for the load operation. Simultaneously, this microinstruction is also attempting to fetch the operands for the next instruction, but since the next instruction has not yet been received, the source of these operands is unknown. The operands are attempted to be fetched from register file and control 14.

The decodes in control decodes 18 which indicate that the load request and the instruction fetch are unsuccessful become available late in this first cycle. Such decodes may be used to control latch 19 before the beginning of cycle 2. Consequently, in this situation the microinstruction that is attempting to be executed has no successful micro-operations. Therefore, latch 19 is not changed and the microinstruction is re-executed entirely in the next cycle. Since the microinstruction in latch 19 is being re-executed, any data being fetched from control store 17 is ignored.

During cycle 2, channel interface unit 16 is still unavailable, but the next instruction becomes available from instruction prefetch unit 13. The microinstruction for cycle 3 must repeat the load request since the channel interface unit was unavailable, but it cannot access another instruction from the instruction prefetch unit 13. The control of latch 19 is much more complex at the end of cycle 2. Essentially three operations are taking place.

First, the microinstruction fields which generate the load request and compute the address for the load are held in latch 19. This holding operation repeats those micro-operations of the microinstruction in the following clock cycle. Second, the microinstruction field which accesses the next instruction from instruction prefetch unit 13 is provided with a NO OP (no operation) signal in latch 19. This NO OP is done by clearing the bits in latch 19 which make up that microinstruction field. Here the cleared state of latch 19 is defined as a NO OP to instruction prefetch unit 13. This NO OP is required to prevent the instruction prefetch unit 13 from sequencing through instructions which have not yet been executed.

Finally, the microinstruction field which controls the operand fetch from the register file and control 14 is held in latch 19. In this situation, the operand fetch is successful but the operands cannot be used by execution unit 15 in the next cycle because execution unit 15 is being presently used to compute the load address as shown in FIG. 3. Consequently, the operand fetch operation is simply repeated in the next clock cycle.

During cycle 3, channel interface unit 16 becomes available so the load operation is successfully completed. Latch 19 is then available for the next microinstruction which is being fetched from control store 17. This microinstruction is latched and executed in cycle 4 if all required subprocessors are available during this clock cycle. If not, then each individual micro-operation is carried out in a given clock cycle according to the availability of such required processors. This procedure continues until all micro-operations in a given microinstruction are executed. At this time, the next microinstruction is fetched from control store 17 to latch 19 and the process continues.

Although the description of the operation of the invention provided herein has been primarily directed to a particular illustration, the microinstruction executed in FIG. 3, it will be understood that the invention may be used to execute any number of microinstructions. Additionally, it will be understood that many modifications and variations in hardware and operational technique and use are possible within the contemplated scope of the invention without departing from the spirit of the invention.

What is claimed is:

1. A microprogrammed parallel processor including a plurality of processing units, operable under control of microinstructions each containing a plurality of micro-operations, said microprogrammed parallel processor comprising:

means for executing, during a cycle, each of said plurality of micro-operations, within a microinstruction, for which a required processing unit is available;

means connected to said executing means for indicating which micro-operations were not executed during the cycle;

means, connected to said executing means and said indicating means for recycling only those micro-operations within said microinstruction for which said indicating means indicated as not executed during the cycle, for execution by said executing means in a subsequent cycle as each required processing unit becomes available; and means, connected to said means for recycling, for storing said microinstruction until all of said plurality of micro-operations within said microinstruction are executed.

2. A microprogrammed parallel processor according to claim 1 wherein said means for recycling further comprises:

decoding means connected between said storing means and said plurality of processing units for checking the availability of each processing unit required by a micro-operation; and, sequencing means, operatively connected between said plurality of processing units and said storing means, for controlling the sequencing of micro-operations within said microinstruction in said storing means, said sequencing means enabling the execution of a micro-operation subsequent to the availability of a required processing unit, said sequencing means further initiating the recycling of a micro-operation subsequent to the unavailability of a required processing unit.

3. A microprogrammed parallel processor according to claim 1 further comprising means, connected to said storing means, for fetching a next microinstruction to said storing means following execution of all of said plurality of micro-operations within said microinstruction.

4. A microprogrammed parallel processor according to claim 2 wherein said sequencing means further comprises means, operatively connected between said plurality of processing units and said storing means, for signalling said storing means that a micro-operation has been executed, whereby said micro-operation is not recycled.

5. A method for controlling a microprogrammed parallel processor having a plurality of processing units operable under the control of microinstructions, each of said microinstructions including at least two micro-operations requiring the availability of at least one of said plurality of processing units, said method comprising:

executing a micro-operation in a microinstruction for which a required processing unit is available during a cycle;

indicating which micro-operations were not executed during said cycle;

recycling only those micro-operations within said microinstruction indicated as not executed during the cycle;

executing each indicated micro-operation in said microinstruction as its corresponding required processing unit becomes available; and recycling all remaining micro-operations in said microinstruction until all required processing units become available.

6. A method according to claim 5 further comprising fetching a next microinstruction for execution subsequent to all micro-operations in said microinstruction being executed.

* * * * *